(12) United States Patent
Wu et al.

(10) Patent No.: US 8,896,279 B2
(45) Date of Patent: Nov. 25, 2014

(54) MULTI-PHASE NON-INVERTING BUCK BOOST VOLTAGE CONVERTER

(75) Inventors: Xuelin Wu, Plano, TX (US);
Congzhong Huang, Plano, TX (US);
Shea Petricek, Dallas, TX (US)

(73) Assignee: Intersil Americals LLC, Milpitas, CA (US)

( * ) Notice: Subject to any disclaimer, the term of this patent is extended or adjusted under 35 U.S.C. 154(b) by 353 days.

(21) Appl. No.: 13/160,162

(22) Filed: Jun. 14, 2011

(65) Prior Publication Data

US 2011/0241636 A1  Oct. 6, 2011

Related U.S. Application Data

(63) Continuation-in-part of application No. 12/848,579, filed on Aug. 2, 2010, now Pat. No. 8,305,055.

(60) Provisional application No. 61/299,511, filed on Jan. 29, 2010, provisional application No. 61/450,495, filed on Mar. 8, 2011.

(51) Int. Cl.
*G05F 1/62* (2006.01)
*H02M 3/158* (2006.01)
*G05F 1/575* (2006.01)

(52) U.S. Cl.
CPC .......... *H02M 3/1584* (2013.01); *Y02B 70/1466* (2013.01); *H02M 3/1588* (2013.01)
USPC .......................................... 323/272; 323/259

(58) Field of Classification Search
CPC . H02M 3/158; H02M 3/1582; H02M 3/1584; H02M 2003/158; H02M 2003/1584
USPC .................................. 323/225, 259, 271, 272
See application file for complete search history.

(56) References Cited

U.S. PATENT DOCUMENTS

| 4,974,141 | A  | 11/1990 | Severinsky et al. |
| 6,788,033 | B2 | 9/2004  | Vinciarelli |
| 7,288,924 | B2 | 10/2007 | Trandafir et al. |
| 7,777,457 | B2 | 8/2010  | Haiplik |

(Continued)

OTHER PUBLICATIONS

U.S. Patent and Trademark Office, "Notice of Allowance and Fees Due", "from U.S. Appl. No. 12/848,579", Sep. 17, 2012, pp. 1-5, Published in: US.

(Continued)

*Primary Examiner* — Gary L Laxton
(74) *Attorney, Agent, or Firm* — Fogg & Powers LLC

(57) ABSTRACT

A multi-phase non-inverting buck boost voltage converter has a plurality of buck boost voltage regulators. Each regulator is associated with a separate phase for generating a regulated output voltage responsive to an input voltage. A plurality of current sensors are each associated with one of the plurality of buck boost voltage regulators for monitoring an input current to the associated buck boost voltage regulator and generating a current sense signal for the associated phase. A plurality of buck boost mode control circuitries are each associated with one of the buck boost regulator for controlling an associated buck boost voltage regulator using peak current mode control in a buck mode of operation and valley current mode control in boost mode of operation responsive to a common error voltage and the associated current sense signal. The plurality of buck boost mode control circuitries provides current balancing between the phases. A voltage error circuit generates the error voltage responsive to the regulated output voltage.

23 Claims, 13 Drawing Sheets

(56) References Cited

U.S. PATENT DOCUMENTS

| | | | |
|---|---|---|---|
| 7,804,283 B2* | 9/2010 | Krellner et al. | 323/259 |
| 8,179,113 B2* | 5/2012 | Singnurkar | 323/283 |
| 8,305,055 B2 | 11/2012 | Wu et al. | |
| 8,305,061 B1* | 11/2012 | Zhang et al. | 323/283 |
| 8,319,484 B2* | 11/2012 | Houston | 323/272 |
| 8,436,591 B2* | 5/2013 | Dearn | 323/225 |
| 2010/0019745 A1* | 1/2010 | Keskar et al. | 323/271 |

OTHER PUBLICATIONS

U.S. Patent and Trademark Office, "Office Action", "from U.S. Appl. No. 12/848,579", Jul. 23, 2012, pp. 1-10, Published in: US.

The Korean Intellectual Property Office, "Notice of Allowance from KR Application No. 10-2011-0076799 mailed Jan. 9, 2014", "from Foreign Counterpart of U.S. Appl. No. 13/160,162", Jan. 9, 2014, pp. 13, Published in: KR.

The State INtellectual Property Office of the People's Republic if China, "Office Action from CN Application No. 201110037338.0 mailed Jan. 30, 2014", "from Foreign Counterpart of U.S. Appl. No. 12/848,579", Jan. 30, 2014, pp. 1-11, Published in: CN Taiwan Intellectual Property Office, "Office Action from TW Application No. 100125420 mailed Mar. 4, 2014", "From Foreign Counterpart of U.S. Appl. No. 13/160,162", Mar. 4, 2014, pp. 1-7, Published in: TW.

State Intellectual Property Office, P.R. China, "Second Ofice Action from CN Application No. 201110037338.0 mailed May 22, 2014", "from Foreign Counterpart of U.S. Appl. No. 12/848,579", May 22, 2014, pp. 1-7, Published in: CN.

\* cited by examiner

US 8,896,279 B2

MULTI-PHASE NON-INVERTING BUCK BOOST VOLTAGE CONVERTER

CROSS-REFERENCE TO RELATED APPLICATIONS

This application is a continuation-in-part of U.S. patent application Ser. No. 12/848,579, filed Aug. 2, 2010, entitled NON-INVERTING BUCK BOOST VOLTAGE CONVERTER, which claims benefit of U.S. Provisional Application No. 61/299,511 entitled SYSTEM AND METHOD FOR NON-INVERTING BUCK BOOST CONVERTERS, filed Jan. 29, 2010, the specifications of which are incorporated herein by reference in their entirety, this application also claims priority to U.S. Provisional Patent Application No. 61/450,495 filed on Mar. 8, 2011, entitled MULTI-PHASE NON-INVERTING BUCK BOOST VOLTAGE CONVERTER, which is incorporated herein by reference.

BRIEF DESCRIPTION OF THE DRAWINGS

For a more complete understanding, reference is now made to the following description taken in conjunction with the accompanying Drawings in which.

DETAILED DESCRIPTION

Figure 1:
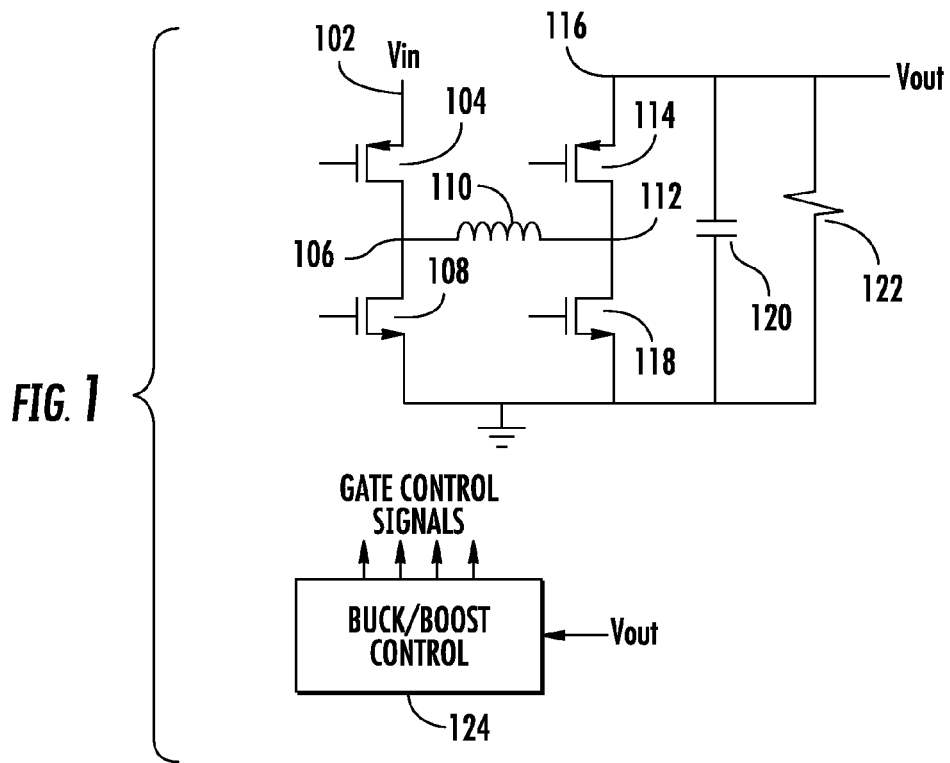
FIG. 1 is a schematic diagram of a buck boost converter.

Referring now to the drawings, wherein like reference numbers are used herein to designate like elements throughout, the various views and embodiments of a non-inverting buck boost voltage converter are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Non-inverting buck boost converters are capable of achieving a positive output voltage that is higher or lower than its input voltage. As battery powered devices are becoming more and more popular, this topology is becoming more attractive as it can make the use of the discharge cycles of a battery. When a battery input voltage is higher than its output voltage, a buck boost converter works in the buck mode of operation. In the buck mode of operation, the converter decreases the input voltage to the necessary level for use at its output. When the battery input voltage is lower than the output voltage, the buck boost converter works in the boost mode of operation wherein the input voltage is increased to a level needed at the output. It is relatively easy to implement the control in either a pure buck mode of operation or a pure boost mode of operation by leaving some power switches turned on or off. The challenge remains in the transition between the buck and boost modes of operation when the output voltage is close to the input voltage. There are two challenges to controlling the buck boost converter during this transition between buck and boost modes of operation. One challenge involves the line transient, which is a dynamic response. The other challenge is the output ripple wherein the generated input voltage is close to the output voltage which is a steady state performance issue.

The below described implementation comprises a scheme to control non-inverting buck boost converters and provide a method to achieve a smooth transition between modes and line transients while still maintaining minimum ripple voltage when the output voltage is close to the input voltage. Only one integrated current sensor is utilized in the scheme instead of multiple sensors to reduce the complexity and simplify the overall design. The controller uses a peak current mode control in the buck mode of operation and a valley current control mode in the boost mode of operation using cycle-by-cycle detection. This method provides smooth transitions and line transients within the converter. In the case when the output voltage is close to the input voltage, the buck boost converter switches from the buck mode of operation to the boost mode of operation or from the boost mode of operation to the buck mode of operation automatically by monitoring the maximum duty cycle. This simplifies the control of the buck boost converter and reduces the output voltage ripple. Both buck mode operations and boost mode operations use the same integrated current sensor which reduces the complexity of the system and increases the overall reliability.

Non-inverting buck-boost converters are capable of achieving positive output voltage higher or lower than its input voltage. Many applications prefer non-inverting buck-boost converters such as battery powered devices which are eager to make use of the discharge cycle of the battery. Battery powered electronics and automobiles experience inferior battery voltage due to situations where load dump or cold cranking occur. In these cases, non-inverting buck-boost converters are an ideal candidate. If the load power is high, multi-phase buck-boost converters are needed for low cost and heat dissipation.

Referring now to the drawings, and more particularly to FIG. 1, there is illustrated a schematic diagram of a buck boost converter. The buck boost converter includes an input voltage node 102 into which the input voltage $V_{IN}$ is applied. A high side buck transistor 104 comprises a P-channel transistor having its source/drain path connected between node 102 and node 106. A low side buck transistor 108 comprises an N-channel transistor having its drain/source path connected between node 106 and ground. An inductor 110 is connected between node 106 and node 112. A high side P-channel boost transistor 114 has its source/drain path connected between the output voltage node $V_{OUT}$ 116 and node 112. A low side boost transistor 118 comprises an N-channel transistor having its source/drain path connected between node 112 and ground. As it is well understood by people skilled in the art the high side buck and boost transistors can be implemented also by N-channel transistors. Furthermore, all the switching transistors can be implemented by bipolar transistors or any other suitable controlled switching devices. The output capacitance 120 is connected between the output voltage node 116 and ground. The output load resistance 122 is connected in parallel with the capacitance 120 between node 116 and ground. Each of the high side buck transistor 104, low side buck transistor 108, high side boost transistor 114 and low side boost transistor 118 have their gates connected to buck boost control circuitry 124. The buck boost control circuitry 124 generates gate control signals via a plurality of outputs using internal control logic that is responsible to at least the output voltage $V_{OUT}$ applied from node 116. The duty cycle in the buck mode of operation is defined as $D=t_{on(104)}/T$, where $t_{on}$ is the on-time of switching transistor 104 and T is the switching period of the converter. T is the inverse of the switching frequency, fsw, (T=1/fsw). During boost operation, the duty cycle is defined to be $D=t_{on(118)}/T$, i.e. the on-time of synchronous high side boost transistor 114 divided by the switching period.

Figure 2:
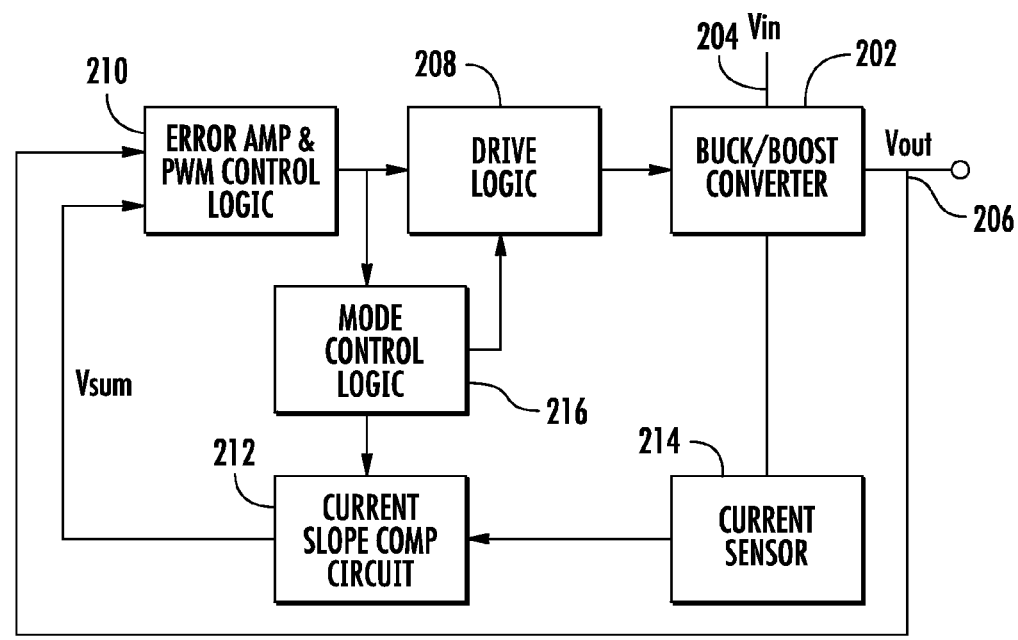
FIG. 2 illustrates a functional block diagram of the non-inverting buck boost converter of the present disclosure.

Referring now to FIG. 2, there is illustrated a functional block diagram of a non-inverting buck boost converter operating according to the present disclosure. The buck boost converter circuitry 202 receives the input voltage $V_{IN}$ at input node 204 and provides the output voltage $V_{OUT}$ at the node 206. Switching transistors within the buck boost converter 202 are driven according to drive control signals provided from drive logic 208. The drive logic 208 generates the drive control signals to the switching transistors responsive to PWM control signals provided from PWM control logic 210. The Error amplifier and PWM control logic 210 generates the PWM control signals responsive to the output voltage monitored at node 206 and also responsive to the current control voltage VSUM provided from current slope control compensation logic 212. The current slope control compensation logic generates the VSUM voltage to the Error amplifier and PWM control logic 210 responsive to a monitored current within the buck boost converter 202 provided by a current sensor 214 and mode control logic 216. The current sensor 214 measures the input current provided at the input node 204 of the buck boost converter 202. The mode control logic 216 determines whether the buck boost converter 202 is operating in the buck mode of operation or the boost mode of operation by monitoring the PWM signals provided from the PWM control logic 210. The mode control logic 216 additionally provides mode control signals to the drive logic 208 to control the operation of the switching transistors within the buck boost converter 202.

Figure 3:
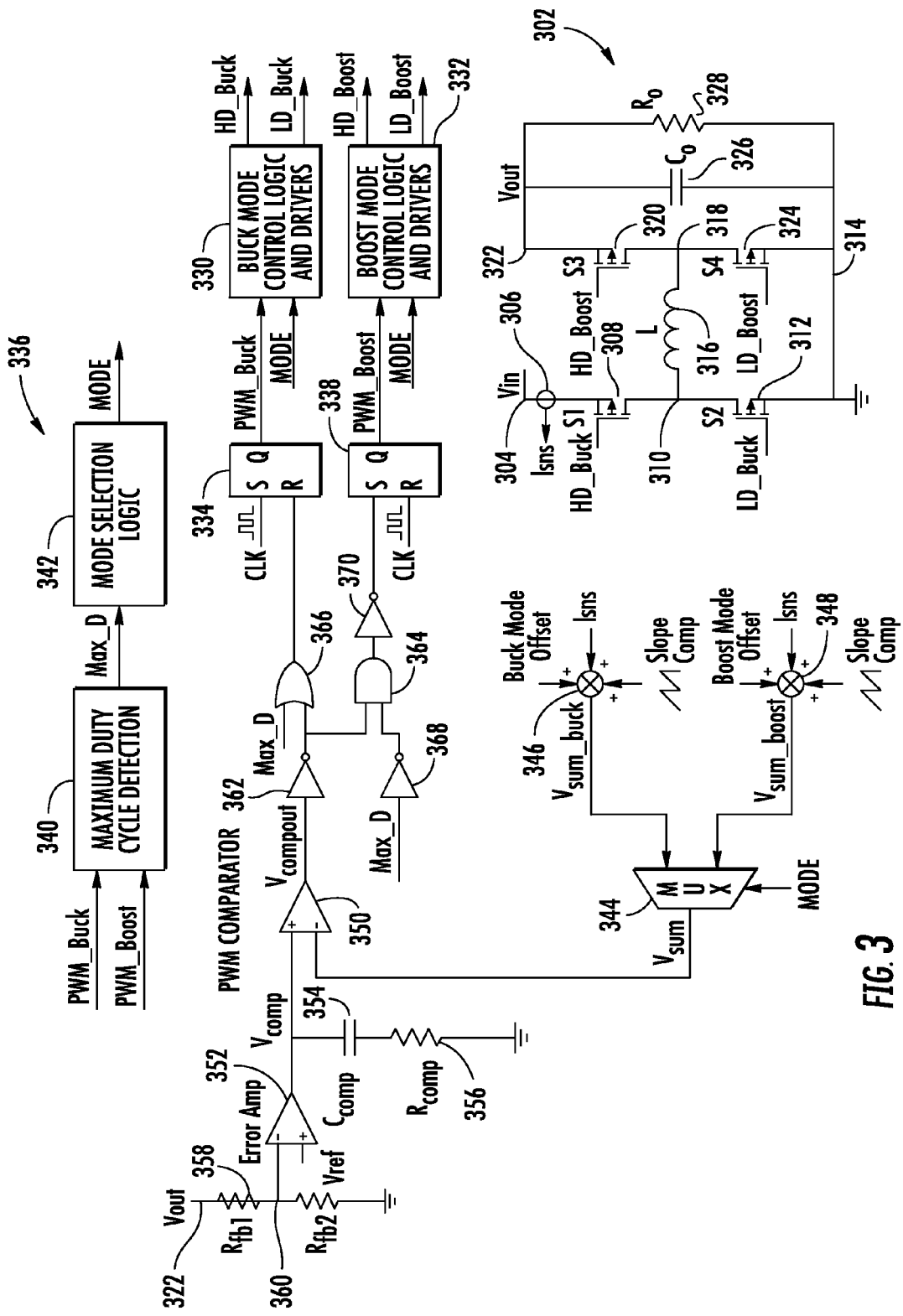
FIG. 3 provides a more detailed block diagram of the non-inverting buck boost converter of the present disclosure.

Referring now to FIG. 3, there is illustrated a block diagram of the non-inverting buck boost converter of the present disclosure. The buck boost converter 302 includes an input voltage node 304 to which the input voltage $V_{IN}$ is applied. A current sensor 306 senses the input voltage current through node 304 and provides a sensed input current ISNS. A high side buck transistor 308 is connected between the current sensor 306 and node 310. The high side buck transistor 308 comprises a P-channel transistor. The high side buck transistor 308 is connected to receive the drive signal HD_BUCK. A low side buck transistor 312 comprises a N-channel transistor having its drain/source path connected between node 310 and the ground node 314. The low side buck transistor 312 is connected to receive the drive control signal LD_BUCK. An inductor 316 is connected between node 310 and node 318.

A high side boost transistor 320 comprises a P-channel transistor having its source/drain path connected between the output voltage node $V_{OUT}$ 322 and node 318. The low side boost transistor 321 comprises an N-channel transistor having its drain/source path connected between node 318 and node 314. The gate of transistor 324 is connected to receive the drive control signal LD_BOOST. The gate of high side boost transistor 320 is connected to receive the drive control signal HD_BOOST. An output capacitor 326 is connected to the output voltage node 322 between the output voltage node 322 and the ground node 314. Additionally, a load 328 is connected in parallel with the output capacitance 326 between the output voltage node 322 and the ground node 314.

The drive control signals to each of the high side buck transistor 308, the low side buck transistor 312, the high side boost transistor 320 and the low side boost transistor 324 are provided from the buck mode current logic and drivers 330 and the boost mode control logic and drivers 332, respectively. The buck mode control logic and drivers 330 generate the HD_BUCK signal to the high side buck transistor 308 and the LD_BUCK signal to the low side buck transistor 312 responsive to a PWM signal (PWM_BUCK) provided from SR latch 334 and a mode control signal provided from the mode control logic 336. The boost mode control logic and drivers 332 generate the HD_BOOST drive signal to transistor 320 and the LD_BOOST drive signal to transistor 324 responsive to a PWM control signal (PWM_BOOST) from SR latch 338 and a mode control signal from the mode control logic 336. The transistors 308 and 312 are the power switches for the buck boost converter 302 in the buck mode of operation. In the buck mode of operation, transistor 320 is always turned on and transistor 324 is always turned off. Likewise, in the boost mode of operation, the buck mode control logic and drivers 330 and the boost mode control logic and drivers 332 control the boost transistors 320 and 324 to comprise the power FET switches. In the boost mode of operation the transistor 308 is always turned on while the transistor 312 off.

The SR latch 334 generates the buck PWM signal to the buck mode control logic and drivers 330 responsive to a clock signal provided at the S input of the SR latch 334 and a logic signal applied to the R input of the SR latch 334. The PWM signal PWM_Boost is provided from the Q output of SR latch 338 responsive to a clock input provided to the R input of the SR latch 338 and a logic input provided to the S input of SR latch 338.

The mode control logic 336 provides the MODE signal to each of the buck mode control logic and drivers 330 and the boost mode control logic and drivers 332. The mode control logic 336 generates the output control signal MODE to each of the buck mode control logic and drivers 330 and the boost mode control logic and drivers 332 responsive to the PWM_BUCK and PWM_BOOST signals provided from the outputs of SR latches 334 and 338, respectively. The maximum duty cycle detection circuit 340 determines when a maximum duty cycle condition exists between the buck and boost modes of operation responsive to the output voltage $V_{OUT}$ approaching the input voltage $V_{IN}$. When a maximum duty cycle condition is detected, the maximum duty cycle detection circuit 340 generates a logical "high" value for the MAX_D signal which is provided to the mode selection logic 342.

The mode selection logic 342 determines whether the buck boost converter 302 needs to switch to either the buck mode of operation or the boost mode of operation and generates a mode control signal MODE to indicate this change. In order to smoothly switch from buck operation to boost operation or from boost operation to buck operation, the determination of the maximum duty cycle is introduced into the control scheme by the maximum duty cycle detection circuit 340. Anytime a maximum duty cycle condition is detected the MAX_D signal goes to a logical "high" level. This normally occurs when the input voltage $V_{IN}$ is close to the output voltage $V_{OUT}$ or when load transients occur in the output. The mode selection logic 342 determines if the operation mode of the buck boost converter 302 is either buck or boost. A simple control method is implemented such that whenever a MAX_D logical "high" signal is detected, the operational mode is toggled. More sophisticated control methods can be applied by using multiple MAX_D signals. There are two, and only two modes operating within the buck boost converter either buck or boost. The output "MODE" signal of the mode selection logic acts like a multiplexer control signal to select the operational circuits, e.g., current sensing and switch driver control logic depending on whether the converter is in the buck or boost mode of operation. Thus, the MODE control signal selects either the buck mode control logic drivers 330 or the boost mode control logic and drivers 332 depending upon the mode of operation and also selects the current sensing compensation signal provided from the output of multiplexer 344.

The multiplexer 344 is connected to receive either the VSUM_BUCK signal or the VSUM_BOOST signal. The VSUM_BUCK signal comprises a summation of the sensed current from current sensor 306, a buck mode offset signal and a buck slope compensation signal which are added together at adder circuit 346. The VSUM_BOOST signal is generated at an adder circuit 348 by adding together the ISNS input current measurement from current sensor 306, a boost mode offset signal and a boost slope compensation signal. The sensed current ISNS from the current sensor 306 is summed with the buck mode offset or the boost mode offset to ensure that the error amplifier 352 is operating with a proper DC bias. The buck or boost compensation slope is added to the sensed current to avoid sub harmonic oscillation in large duty cycle operations. Each of the VSUM_BUCK and VSUM_BOOST compensation signals are provided to an input of the multiplexer 344. Depending on whether the buck boost converter 302 is operating in the buck mode of operation or the boost mode of operation either the VSUM_BUCK (buck mode) or the VSUM_BOOST (boost mode) are selected responsive to the MODE signal at the multiplexer 344 and the selected signal is provided as the output current compensation signal $V_{SUM}$.

The $V_{SUM}$ signal is provided to the inverting input of a PWM comparator 350 from the multiplexer 344. The non-inverting input of the PWM comparator 350 is connected to receive the voltage error signal $V_{COMP}$ from an error amplifier 352. The output of the error amplifier 352 is connected to ground through a capacitor 354 in series with a resistor 356. The inverting input of the error amplifier 352 monitors the output voltage $V_{OUT}$ at node 322 through a resistor divider consisting of a resistor 358 connected between node 322 and node 360 and a resistor connected between node 360 and ground. The inverting input of error amplifier 352 is connected to node 360. The error amplifier 352 compares a reference voltage $V_{REF}$ applied at its non-inverting input to the output feedback voltage from the buck boost converter 302 to generate the error signal $V_{COMP}$. The $V_{COMP}$ signal is used to determine the inductor current through inductor 316 in both a peak current mode when the buck boost converter is operating in the buck mode of operation and a valley current mode when the buck boost converter is operating in the boost mode of operation. Buck operation and boost operation share the same voltage error signal. The comparison of $V_{SUM}$ from the output of multiplexer 344 to the voltage error signal $V_{COMP}$ determines the on/off state of the power transistors 308, 312, 320 and 324.

The output of the PWM comparator 350 ($V_{COMPOUT}$) is provided as an input to an inverter 362 and to a first input of AND gate 364. The inverted output from inverter 362 is provided to a first input of OR gate 366. The other input of OR gate 366 is connected to receive the MAX_D signal from the output of the maximum duty cycle detection circuitry 340. The output of the OR gate 366 provides the logic signal to the R input of latch 334 to enable generation of the buck PWM signal. The other input of AND gate 364 is connected to the output of an inverter 368. The input of inverter 368 is connected to receive the MAX_D signal from the maximum duty cycle protection circuit 340. The output of AND gate 364 is connected to another inverter 370. The output of the inverter 370 provides a logic signal to the S input of SR latch 338 to provide the boost PWM signal.

Figure 4:
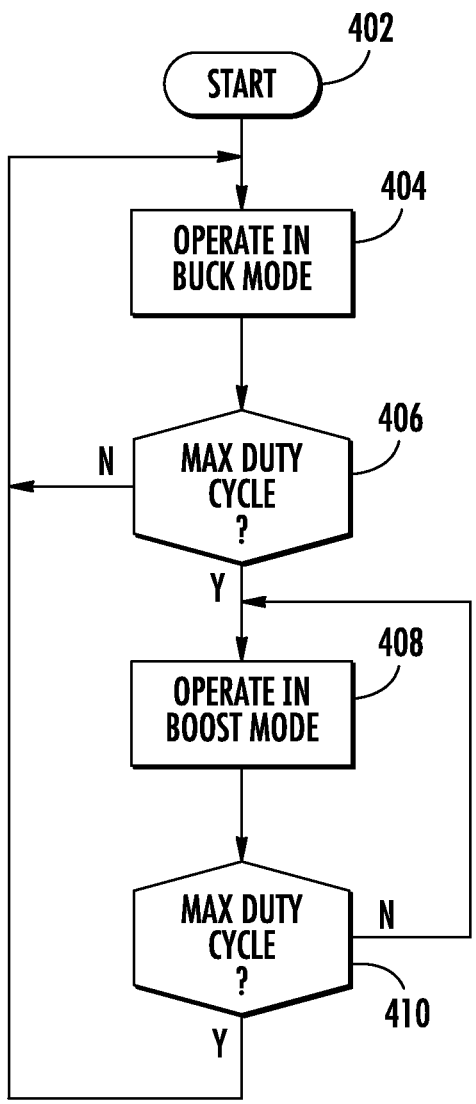
FIG. 4 is a flow diagram illustrating the operation of the non-inverting buck boost converter of FIG. 3.

Referring now to FIG. 4, there is illustrated a flow diagram describing the operation of the buck boost converter of FIG. 3. When the converter operation is initiated at step 402, the converter initially operates in the buck mode of operation at step 404 and is working in the peak current control mode of operation. Inquiry step 406 monitors for the maximum duty cycle and if the maximum duty cycle is not presently detected control passes back to step 404. When maximum duty cycle is detected, the converter enters the boost mode of operation at step 408 and operates using valley current control mode. Inquiry step 410 monitors for the maximum duty cycle and if the maximum duty cycle is not detected, control passes back to step 408. When the maximum duty cycle is detected, the converter converts back to operating in the buck mode of operation at step 404.

Figure 5A:
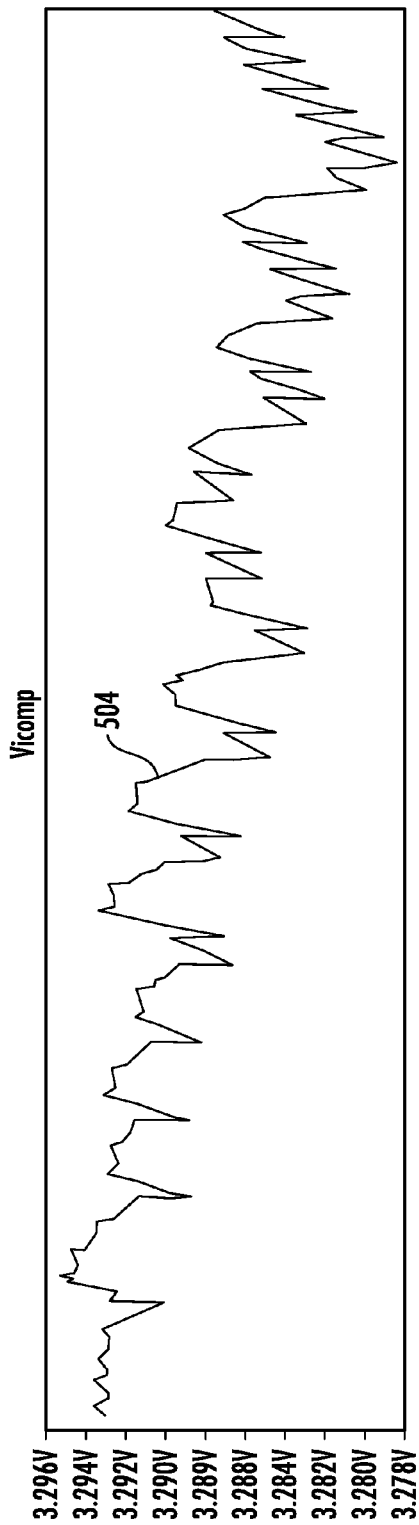
FIGS. 5a-5c illustrates the waveforms of the buck boost converter operation when converting from buck mode of operation to boost mode of operation.
Figure 5B:
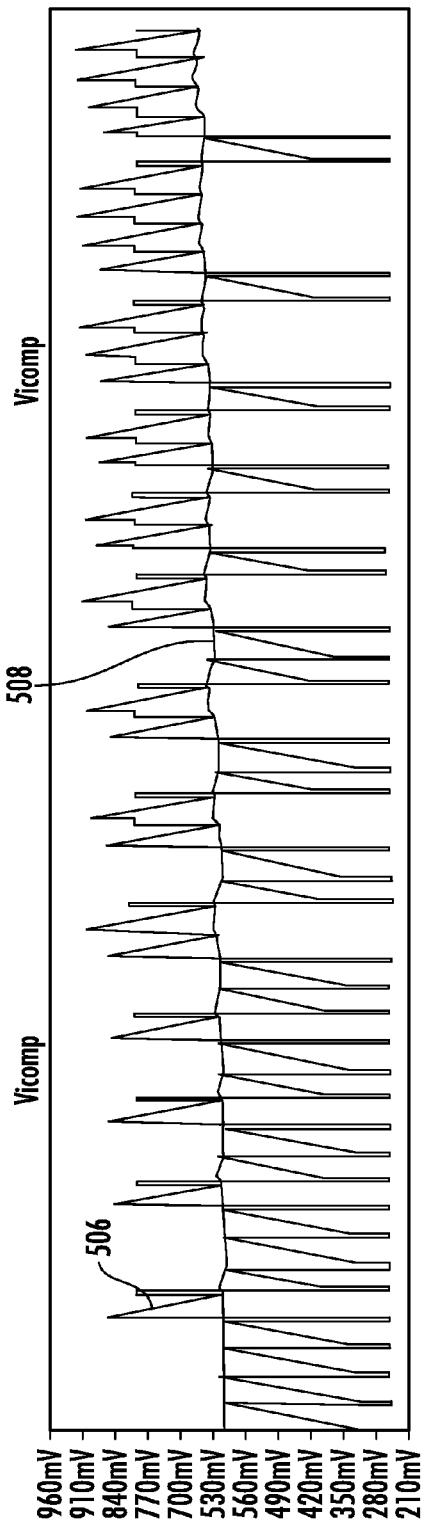
Figure 5C:
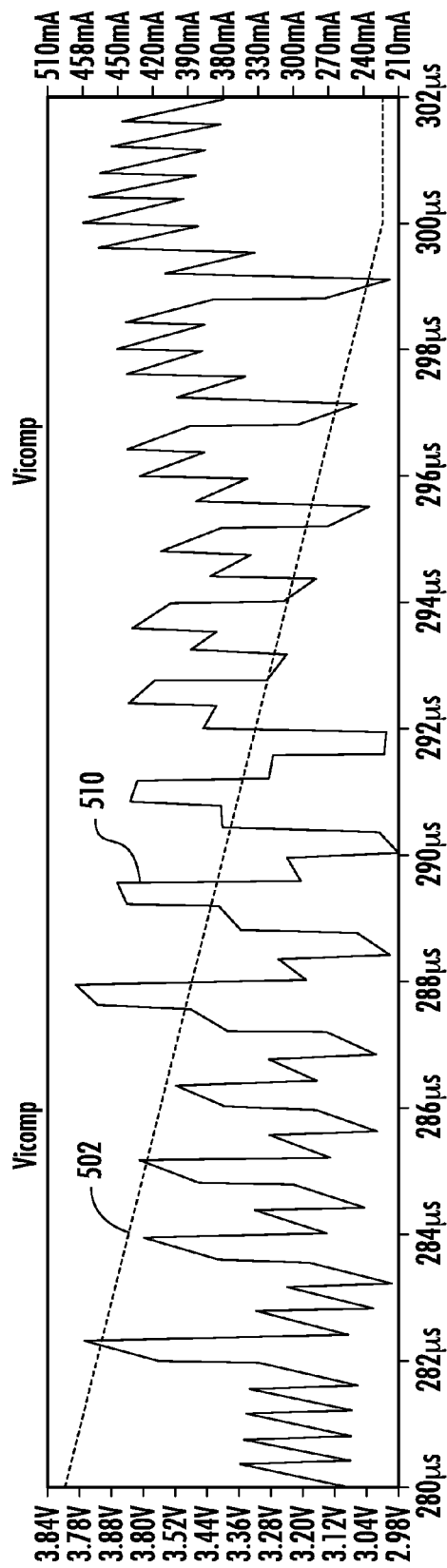

Referring now to FIG. 5, there are illustrated the various waveforms associated with the buck boost converter 302 when the buck boost converter transitions from the buck mode of operation to the boost mode of operation. Transistors 308 and 312 comprise the main power switches in the buck mode of operation. Transistor 320 is always on in the buck mode of operation and transistor 324 is always off in the buck mode of operation. As the input voltage $V_{IN}$ 502 drops, the switching duty cycle increases because D~Vout/Vin. As the input voltage $V_{IN}$ 502 drops to a certain value, the duty cycle reaches a maximum threshold (maximum duty cycle), the maximum duty cycle detection circuit 340, which in one embodiment comprises a digital comparator, responds to this condition and sets the signal MAX_D to a logical "high" level. Simultaneously, the high side transistor 308 is turned off and the transistor 312 is turned on. The mode selection logic 342 knows the next cycle and when the clock signal appears at the input of the SR latch 334, the buck boost converter 302 will transition into boost mode. The control signal MODE is set to a logical "high" level (boost) when the clock pulse arrives, and the buck boost converter is now configured in boost operation. However, in this condition, the input voltage $V_{IN}$ 502 is still a bit higher than the output voltage $V_{OUT}$ 504 so that the boost mode of operation might be pumping too much energy into the load and further increasing the output voltage $V_{OUT}$. Thus, the buck boost converter 302 returns to the buck mode of operation after the boost cycle and remains in the buck mode of operation for more than one cycle until the output voltage $V_{OUT}$ 504 drops below the input voltage $V_{IN}$. As $V_{IN}$ 502 drops further, there will be more boost cycles. In this manner, a smooth transition from buck mode of operation to boost mode of operation is provided. FIG. 5 also illustrates the output of the multiplexer 344, $V_{SUM}$ 506, the output of the error amplifier $V_{COMP}$ 508 and the inductor current 510.

Figure 6A:
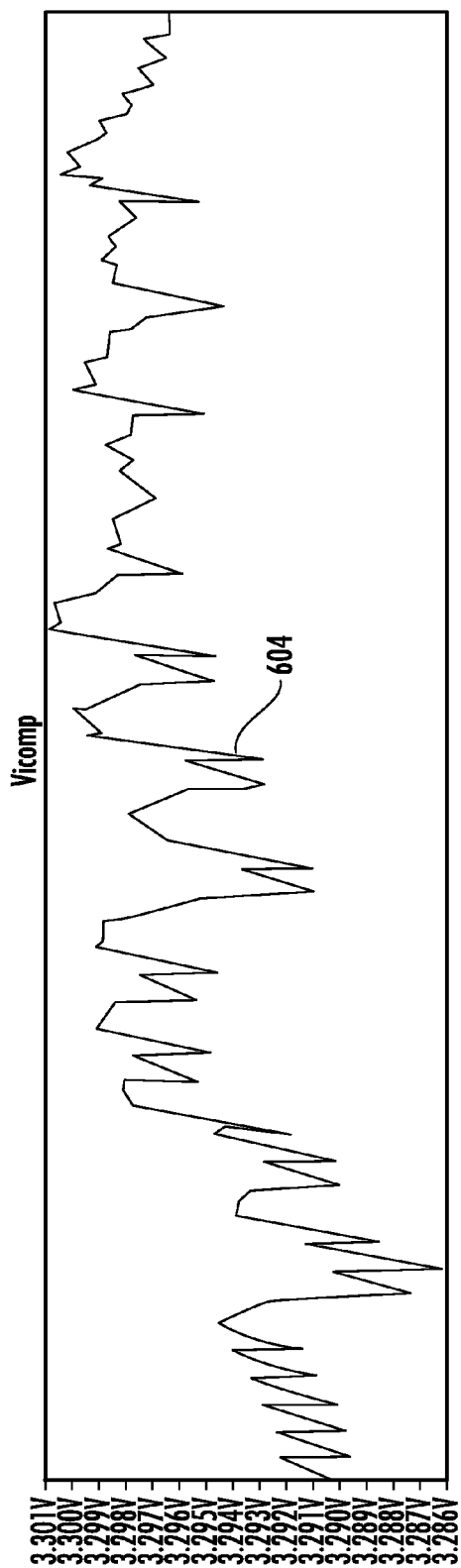
FIGS. 6a-6c illustrates the waveforms of the buck boost converter operation when converting from the boost mode of operation to the buck mode of operation.
Figure 6B:
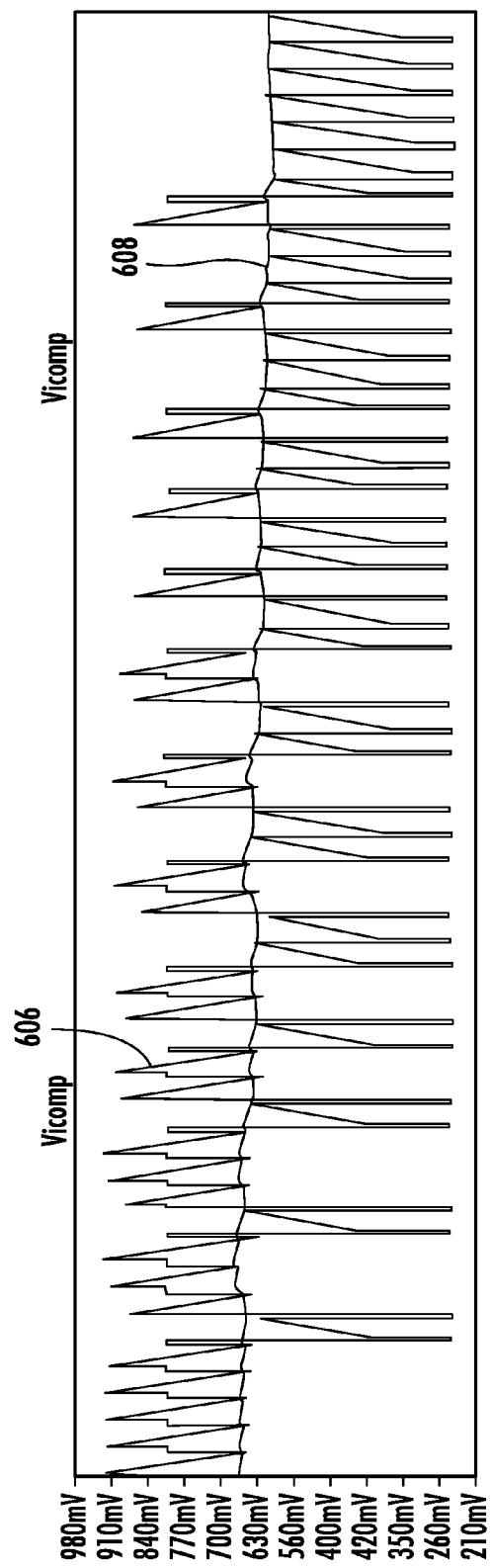
Figure 6C:
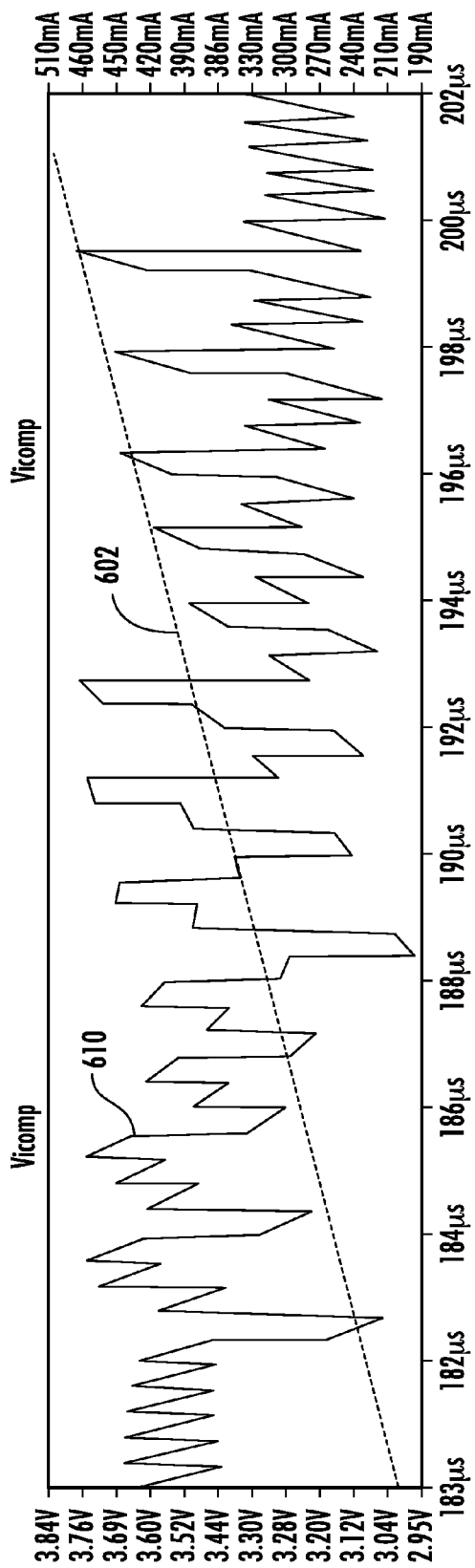

Referring now to FIG. 6, there is illustrated the conversion of the buck boost converter 302 from the boost mode of operation to the buck mode of operation. When the input voltage $V_{IN}$ 602 is much lower than the output voltage $V_{OUT}$ 604, the buck boost converter is running in a pure boost mode of operation. Transistors 320 and 324 comprise the main power switches in the boost mode of operation while transistor 308 is always on and transistor 312 is always off. As the input voltage $V_{IN}$ 602 increases, the switching duty cycles are increasing because the buck boost converter 302 is in the valley control mode of operation. As the input voltage $V_{IN}$ 602 increases to a certain level that the duty cycle reaches a maximum threshold level (maximum duty cycle), the maximum duty cycle detection circuit 340, which comprises a digital comparator, responds to this condition and sets the signal MAX_D to a logical "high" level. Simultaneously, the high side transistor 320 is turned off and low side transistor 324 is turned on. The mode selection logic 342 knows the next cycle, when a clock signal appears, the converter will transmit into buck mode. The signal "MODE" is set to a logical "low" level (buck mode) when the clock signal arrives and the entire buck boost converter is configured in buck mode of operation. However, in this condition, the input voltage $V_{IN}$ 602 is still lower than the output voltage $V_{OUT}$ 604. Thus, the buck mode of operation may be pulling too much energy to the load and the output voltage $V_{OUT}$ 604 decreases. Thus, the buck boost converter 302 returns to the boost mode of operation after the buck cycle and remains in the boost mode of operation for more than one cycle until the output voltage 604 increases. As the input voltage $V_{IN}$ 602 increases further, there may be more buck cycles. In this manner, a smooth transition from boost to buck is provided.

The illustration of FIG. 6 further illustrates the output of the multiplexer 344 $V_{SUM}$ 606, the error voltage output $V_{COMP}$ 608 and the inductor current 610

When the output voltage $V_{OUT}$ is close to the input voltage $V_{IN}$, the buck boost converter 302 is switching from buck to boost and boost to buck mode. There is no independent buck-boost mode just buck mode and boost mode. The control method makes sure of the smooth transition by using peak current control mode in the buck mode of operation and valley current control mode in the boost mode of operation. A major advantage of this method is that the error signal $V_{COMP}$ does not have any abrupt changes during the mode transition. Since the $V_{COMP}$ signal is a direct function of the output voltage $V_{OUT}$, if the error signal $V_{COMP}$ is stable the output voltage $V_{OUT}$ is stable. As previously stated, the output of the multiplexer $V_{SUM}$ is the sum of the input current ISNS, the buck or boost mode offset and a slope compensation signal. The different values of offsets in the buck and boost modes of operation are selected based upon the maximum slope compensation in a full cycle. Usually the different value of the offsets is twice the maximum slope compensation voltage. For example, if the slope compensation is 1V/us and the switching frequency is 1 MHz, the different value of the offsets are 1V/us * 1 us *2, which is 2V. So if the offset in buck mode is Vos, then the offset for the boost mode is Vos+2V). A system operating in this manner provides line transients that are superior in both light loading and heavy loading conditions. The voltage ripple is also small when the output voltage is close to the input voltage. Control method is simple requiring only a single integrated current sensor and cycle-by-cycle detection.

Figure 7:
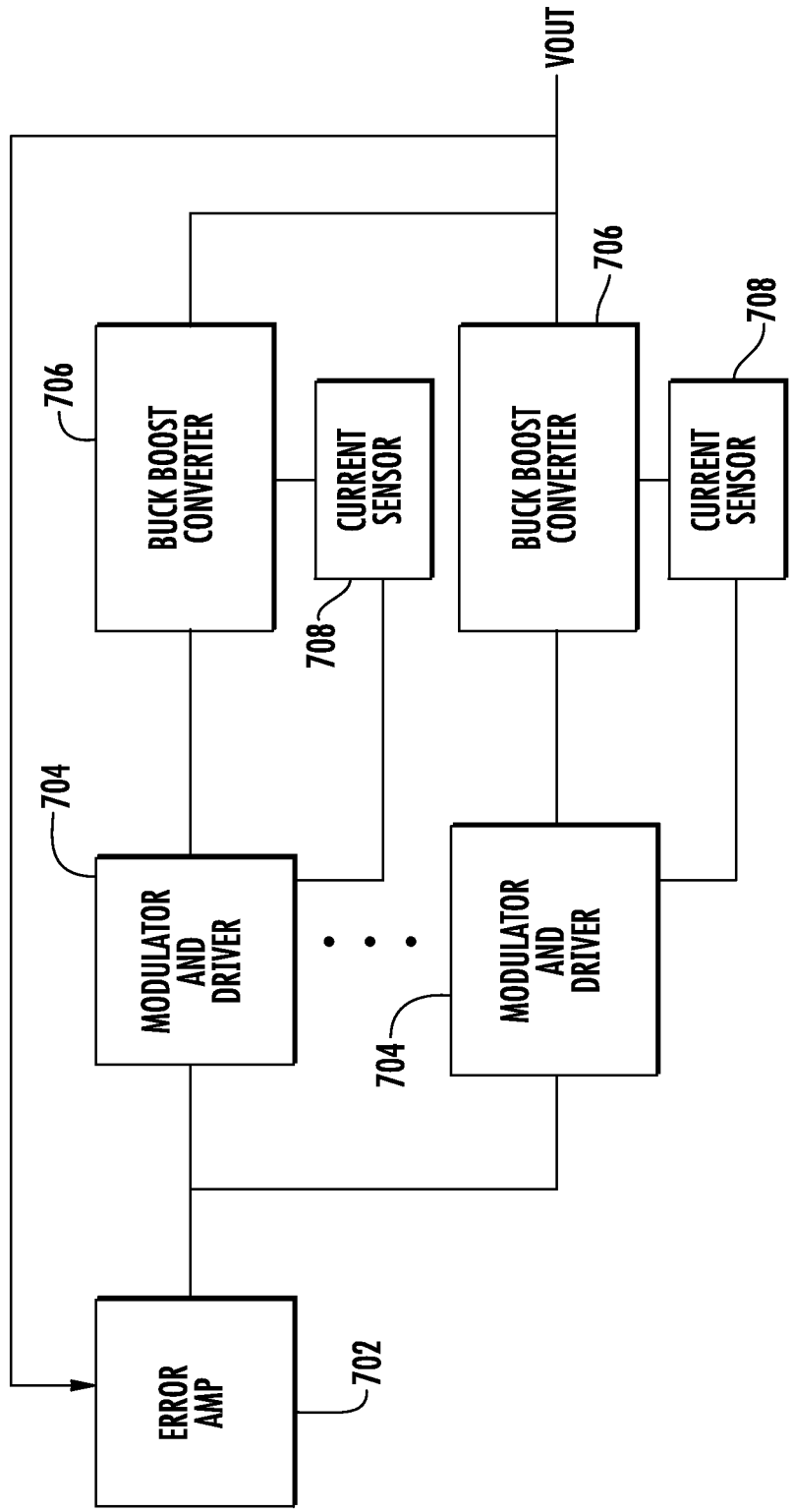
FIG. 7 is a functional block diagram of a multi-phase non-inverting buck-boost converter.

Referring now to FIG. 7, there is illustrated a block diagram of the multi-phase non-inverting buck-boost converter. The error amplifier 702 provides a feedback voltage divider and loop compensation to the multi-phase non-inverting buck-boost converter. The error amplifier 702 generates a compensation signal $V_{COMP}$ that is provided to each of the modulator and driver circuits 704 associated with each phase of the multi-phase non-inverting buck-boost converter. The modulator and driver circuit 704 generates drive signals to an associated buck-boost converter 706 responsive to the $V_{COMP}$ signal from the error amplifier 702 and a current signal $I_{SNS}$ from associated current sensors 708. The current sensors 708 monitor an input current to the associated buck-boost converter 706 in order to generate the $I_{SNS}$ voltage signal to the associated modulator and driver 704. The buck-boost converter 706 generates the output voltage $V_{OUT}$ which is monitored by the error amplifier 702 in order to generate the compensation voltage $V_{COMP}$.

Figure 8:
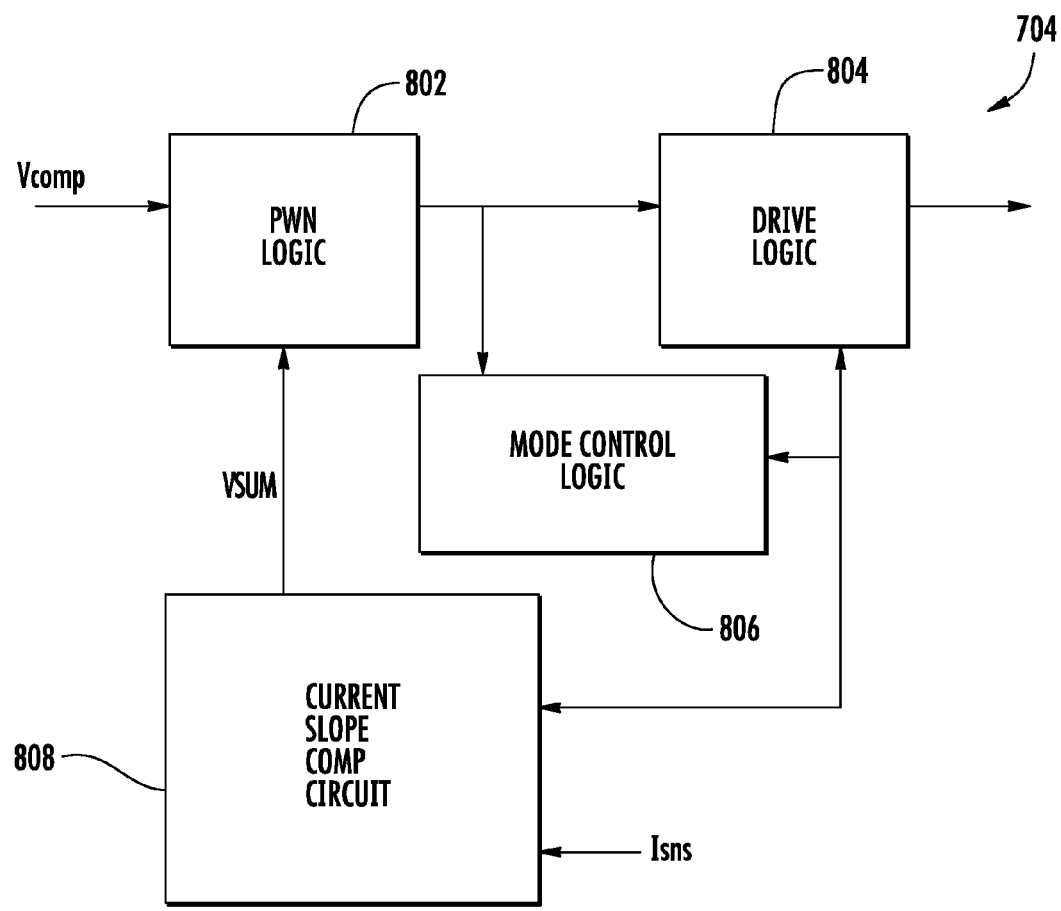
FIG. 8 is a block diagram of the modulator and driver circuitry of the multi-phase buck-boost converter.

Referring now to FIG. 8, there is illustrated a block diagram of the modulator and driver circuitry 704 that is associated with each phase of the multi-phase non-inverting buck-boost converter. The PWM logic 802 generates the PWM control signals to the drive logic 804 and mode control logic 806. The drive logic 804 generates the drive signals to the switching transistors of the associated buck-boost converter responsive to the PWM control signals provided by the PWM logic 802. The mode control logic 806 determines whether the buck-boost converter is operating in the buck mode of operation or the boost mode of operation by monitoring the PWM signal from the PWM logic 802. The mode control logic 806 additionally provides mode control signals to the drive logic 804 to control the operation of the switching transistors within the buck-boost converter. The current slope compensation circuit 808 generates a $V_{SUM}$ voltage to the PWM logic 802 responsive to a monitored current $I_{SNS}$ from the buck-boost converter provided by the current sensor 708 (FIG. 7).

Figure 9:
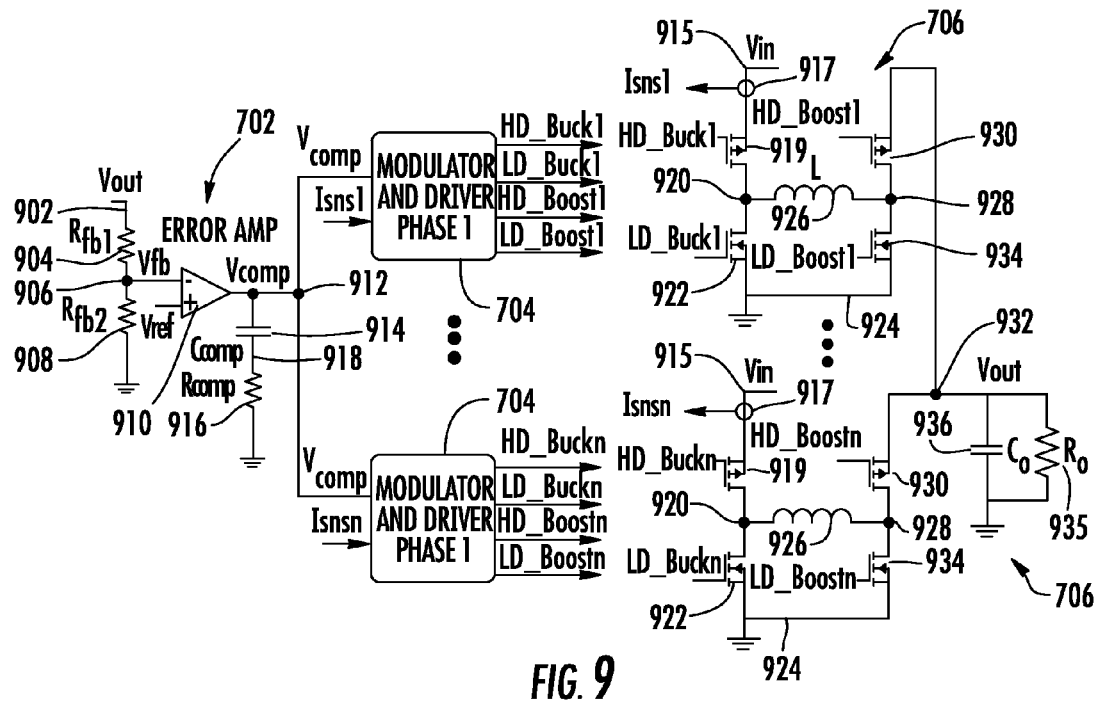
FIG. 9 is a more detailed block diagram of the multi-phase non-inverting buck-boost converter with intrinsic current sharing.

Referring now to FIG. 9, there is provided a more detailed block diagram of the multi-phase non-inverting buck-boost converter that provides intrinsic current sharing between different phase of the buck-boost converter. As described previously, the error amplifier portion 702 monitors the output voltage from the combined outputs of the multiple phases of the buck-boost converter 706 at node 902. The error amplifier circuit 702 includes a voltage divider consisting of a resistor 904 connected between node 902 and node 906 and a resistor 908 connected between node 906 and ground. A feedback voltage $V_{FB}$ is monitored at node 906 by an inverting input of an error amplifier 910. The non-inverting input of error amplifier 910 receives a reference voltage $V_{REF}$ for comparison to the feedback voltage $V_{FB}$. The output of the error amplifier 910 is connected to node 912 to provide a $V_{COMP}$ input to each of the modulator and drivers 704 associated with each phase of the multi-phase non-inverting buck-boost converter. A series connection of the comparator 914 and resistor 916 are connected between node 912 and ground. The comparator 914 is connected between node 912 and node 918 and the resistor 916 is connected between node 918 and ground. The error amplifier 910 comprises a trans conductance amplifier that generates a compensation signal $V_{COMP}$ that is fed to each of the modulator and driver circuit 704. Only a single error amplifier 910 is needed for the system. However, multiple error amplifiers 910 could be placed in parallel and the total gain of the error amplifier would comprise the sum of each of the error amplifiers.

The second portion of the system illustrated in FIG. 9 comprises the modulator and drivers 704. These are each connected to receive the compensation signal $V_{COMP}$ from the error amplifier 910 and a current sensing signal $I_{SNSN}$ related to the sensed input current at the input voltage node of the buck-boost converter associated with the particular phase of the multi-phase converter. Each phase of the converter needs a separate modulator because the clock signal for each phase is different so as to generate interleaved inductor currents and a smaller output and input ripple than a single phase converter. An N-phase converter ideally would have a phase shift of 360/n between adjacent phases. Each phase also has independent current sensing from $I_{SNS1}$ to $I_{SNSn}$. This architecture provides an intrinsic current balancing mechanism. Either in peak current mode in the buck mode of operation of valley current mode control in the boost mode of operation, the sensing current voltage $I_{SNSn}$ is compared to the compensation signal $V_{COMP}$. Since $V_{COMP}$ is a common signal among each modulator, the signal balances the current for each phase. This is a great benefit within the multi-phase converter that reduces the complexity of the design while achieving superior performance. Each phase has its own maximum duty cycle detection circuit and mode selection circuit. When $V_{IN}$ is close to $V_{OUT}$, some phases can be running in buck mode while others are running in boost mode, resulting in a smaller output ripple. The modulator and driver circuits 704 for each phase generate the HD_BUCKn, LD_BUCKn, HD_BOOSTn and LD_BOOSTn for each of the switching transistors associated with its buck-boost converter for the associated phase.

These driver outputs are provided to the associated power switching transistors of the buck-boost converter 706. Each buck-boost converter 706 includes an input voltage node 915 to which the input voltage to be regulated is provided. A current sensor 917 senses the input voltage current through node 915 and provides a sensed input current voltage $I_{SNSn}$. A high side buck transistor 919 is connected between the current sensor 917 and node 920. The high side buck transistor 919 comprises a P-channel transistor. The high side buck transistor 919 is connected to receive the drive signal HD_BUCKn. A low side buck transistor 922 comprises an N-channel transistor having its drain/source path connected between node 920 and the ground node 924. The low side buck transistor 922 is connected to receive the drive control signal LD_BUCKn. An inductor 926 is connected between node 920 and node 928.

A high side boost transistor 930 comprises a P-channel transistor having its source/drain path connected between the output voltage node $V_{OUT}$ 932 and node 928. The low side boost transistor 934 comprises an N-channel transistor having its drain/source path connected between node 928 and ground node 924. The gate of transistor 934 is connected to receive the drive control signal HD_BOOSTn. The high and low side buck and boost switching transistors and current sensor are the same within each of the buck-boost converters associated with each phase of the multi-phase buck-boost converter. Each buck-boost converter has its output connected to node 932. Additionally, a load consisting of a resistor 935 is connected between node 932 and ground. A capacitor 936 is connected in parallel with resistor 935 connected between node 932 and ground.

Figure 10:
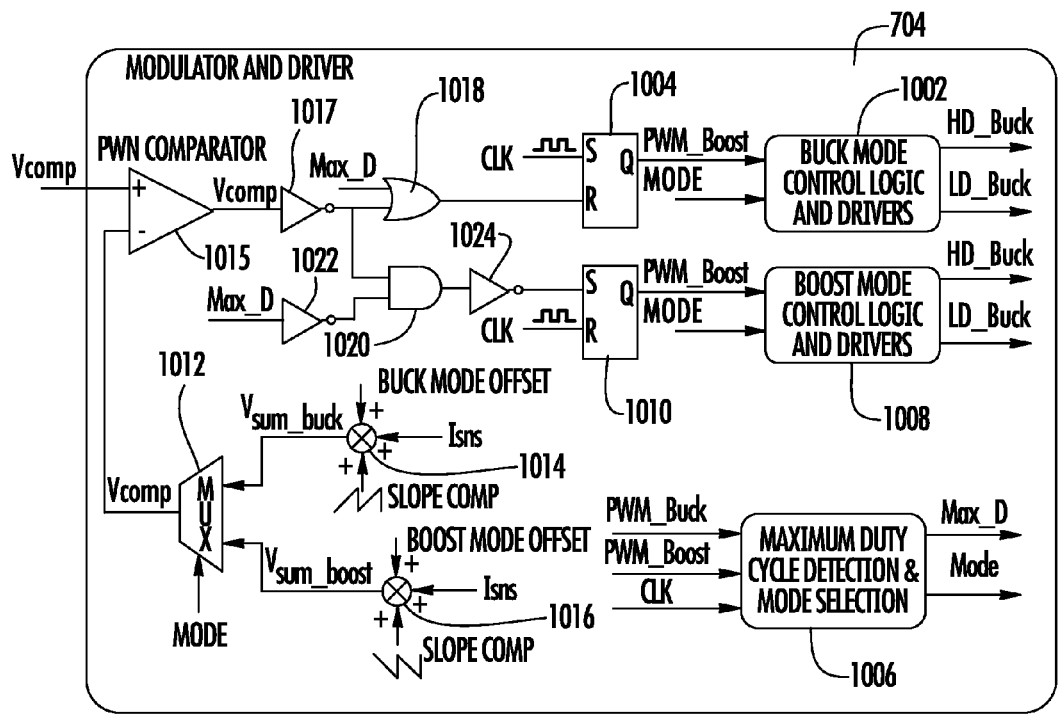
FIG. 10 is a schematic block diagram of the modulator and driver circuitry.

The drive control signals to each of the high side buck transistor 918, the low side buck transistor 922, the high side boost transistor 930 and the low side boost transistor 934 are provided from the modulator and driver circuitry 704. Referring now to FIG. 10, there is more particularly illustrated a schematic block diagram of the modulator and driver circuitry 704 for generating these gate drive switching signals. The buck mode control logic and drivers 1002 generate the HD_BUCKn signal to the high side buck transistor 918 and the LD_BUCKn signal to the low side buck transistor 922 responsive to a PWM signal (PWM_BUCK) provided from SR latch 1004 and the mode control signal provided from the maximum duty cycle detection and mode selection logic 1006.

The boost mode control logic and drivers 1008 generate the HD_BOOSTn drive signal to transistor 930, and the LD_BOOSTn drive signal to transistor 934 responsive to a PWM control signal (PWM_BOOST) from SR latch 1010 and a mode control signal from the maximum duty cycle detection and mode selection logic 1006. The transistors 918 and 922 are the power switches for the buck-boost converter in the buck mode of operation. In the buck mode of operation, transistor 930 is always turned on and transistor 934 is always turned off. Likewise, in the boost mode of operation, the buck mode control logic and drivers 1002 and the boost mode control logic and drivers control the boost transistors 320 and 324 that comprise the power FET switches. In the boost mode of operation, the transistor 918 is always turned on while transistor 922 is always turned off. The SR latch 1004 generates the PWM_BUCK signal to the buck mode control logic and drivers 1002 responsive to a clock signal provided at the S input of the SR latch 1004 and a logic signal applied to the R input of the SR latch 1004. The PWM signal PWM_BOOST is provided from the Q output of SR latch 1010 responsive to a clock input received at the R input of SR latch 1010 and a logic input provided to the S input of SR latch 1010.

The maximum duty cycle detection and mode selection logic 1006 provides the mode signal to each of the buck mode control logic and drivers 1002 and the boost mode control logic and drivers 1008. The maximum duty cycle detection and mode selection logic 1006 generates the output control signal MODE to each of the buck mode control logic and drivers 1002 and the boost mode control logic and drivers 1008 responsive to the PWM_BUCK and PWM_BOOST signals provided from the output of SR latches 1004 and 1010, respectively. The maximum duty cycle detection and mode selection logic 1006 determines when a maximum duty cycle condition exists between the buck and boost modes of operation responsive to the output voltage $V_{OUT}$ approaching the input voltage $V_{IN}$. When the maximum duty cycle condition is detected, the maximum duty cycle detection and mode selection logic 1006 generates a logical "high" value for the MAX_D signal.

The maximum duty cycle detection and mode selection logic 1006 determines whether the buck-boost converter needs to switch to either the buck mode of operation or the boost mode of operation and generates a mode control signal MODE to indicate this change. In order to smoothly switch from buck operation to boost operation or from boost operation to buck operation, the determination of the maximum duty cycle is introduced into the control scheme by the maximum duty cycle detection and mode selection logic 1006. Anytime a maximum duty cycle condition is detected, the MAX_D signal goes to a logical "high." This normally occurs when the input voltage $V_{IN}$ is close to the output voltage $V_{OUT}$ or when load transients occur in the output. The maximum duty cycle detection and mode selection logic 1006 determines if the operation mode of the buck-boost converter is either buck or boost. A simple control method is implemented such that whenever a MAX_D logical "high" signal is detected, the operational mode is toggled. More sophisticated control methods can be applied by using multiple MAX_D signals. There are two, and only two modes operating within the buck-boost converter, either buck or boost.

The mode output "MODE" signal of the maximum duty cycle detection and mode selection logic 1006 acts like a multiplexer control signal to select the operational circuitries, e.g., current sensing and switch driver control logic depending on whether the converter is in the buck or boost mode of operation. Thus, the mode control signal selects either the buck mode control logic drivers 1002 or the boost mode control logic and drivers 1008 depending upon the mode of operation and also selects the current sensing compensation signal provided from the output of a multiplexer 1012.

The multiplexer 1012 is connected to output either the $V_{SUM\_}$BUCK or the $V_{SUM\_}$BOOST signal. The $V_{SUM\_}$BUCK signal comprises a summation of the sensed current from current sensor 916, the buck mode offset signal and a buck slope compensation signal which are added together at an adder circuit 1014. The $V_{SUM\_}$BOOST signal is generated at adder 1016 by adding together the $I_{SNS}$ input current measurement signal from current sensor 916, a boost mode offset signal and a boost slope compensation signal. The sensed current voltage $I_{SNS}$ from the current sensor 916 is summed with the buck mode offset or the boost mode offset to ensure that the error amplifier 910 is operating with a proper DC bias. The buck or boost compensation slope is added to the sensed current to avoid sub-harmonic oscillation in a large duty cycle operation. Each of the $V_{SUM\_}$BUCK and $V_{SUM\_}$BOOST compensation signals are provided to the input of the multiplexer 1012. Depending on whether the buck-boost converter is operating in a buck mode of operation or a boost mode of operation, either the $V_{SUM\_BUCK}$ (buck mode) or the $V_{SUM\_BOOST}$(boost mode) are selected responsive to the mode signal of the multiplexer 1012, and the selected signal is provided as the output current compensation signal $V_{SUM}$.

The $V_{SUM}$ signal is provided to the inverting input of the PWM comparator 1015. The non-inverting input of PWM comparator 1015 is connected to receive the voltage error signal $V_{COMP}$ from the error amplifier 910. The $V_{COMP}$ signal is used as described previously with respect to the single phase mode of operation in the multi-phase mode of operation. The output of the PWM comparator 1015 is provided as an input to an inverter 1017. The inverted output from inverter 1017 is provided to a first input of OR gate 1018 and a first input of AND gate 1020. The other input of OR gate 1018 is connected to receive the MAX_D signal from the output of the maximum duty cycle detection and mode selection logic 1006. The other input of the AND gate 1020 is connected to receive an inverted MAX_D signal from an inverter 1022. The output of the OR gate 1018 provides the logic signal to the R input of the SR latch 1004 to enable generation of the buck PWM signal. The output of AND gate 1020 is provided to an inverter 1024. The output of inverter 1024 provides the S input to SR latch 1010 to assist in generation of the boost PWM signal. The maximum duty cycle detection and mode selection logic 1006 generates the MAX_D control signal and mode control signal responsive to the PWM_BUCK signal from the output of SR latch 1004, the PWM_BOOST signal from the SR latch 1010 and a clock input signal.

Figure 11:
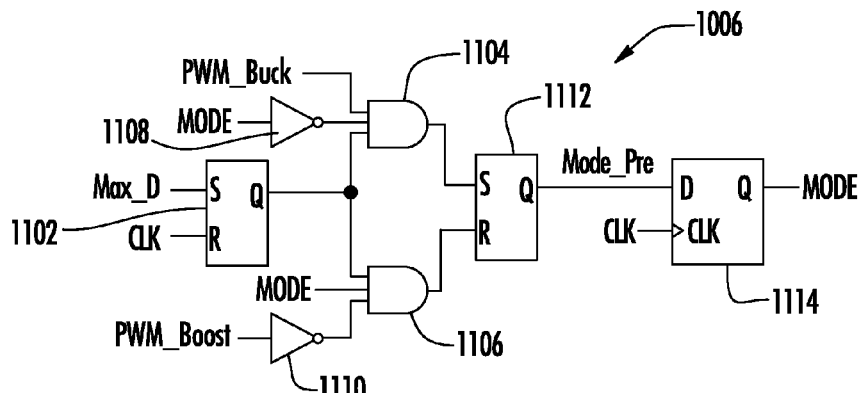
FIG. 11 is a schematic diagram of the maximum duty cycle detection and mode selection circuit.

Referring now to FIG. 11, there is illustrated an implementation of the maximum duty cycle detection and mode selection logic 1006. The MAX_D signal is provided to an S input of an SR latch 1102. A clock input CLK is provided to the R input of the SR latch 1102. The Q output of the SR latch 1102 is provided to one input of a pair of AND gates 1104 and 1106. The AND gate 1104 receives at its inputs the PWM_BUCK signal, an inverted mode signal input from inverter 1108 and the output of SR latch 1102. Similarly, the AND gate 1106 receives the output of SR latch 1102, the mode signal and an inverted version of the PWM_BOOST signal from inverter 1110 at the inputs of the AND gate 1106. The output of AND gate 1104 is provided to the S input of SR latch 1112. The R input of the SR latch receives the output of AND gate 1106. The Q output of SR latch 1112 provides a MODE_PRE signal which is provided to a D input of delay latch 1114. The clock input of the delay latch 1114 is connected to receive the CLK signal and the Q output of delay latch 1114 provides the MODE signal.

The basic operation of the circuit of FIG. 11 is as follows. When $V_{IN}$ is close to $V_{OUT}$, the duty cycle is approaching 100%. In order to maintain switching for each cycle, a maximum duty cycle signal (MAX_D) is preset. Anytime the PWM signals (PWM_BUCK and PWM_BOOST) reach the MAX_D value, a signal MODE_PRE is set or reset depending upon the current operation mode (buck or boost). However, the MODE_PRE is not applied to the modulator initially but only becomes valid upon receipt of the next clock signal pulse, the rising edge of the clock sets the mode signal and adjusts the operational mode of the modulator. Each modulator has its own independent decision making circuit.

Figure 12:
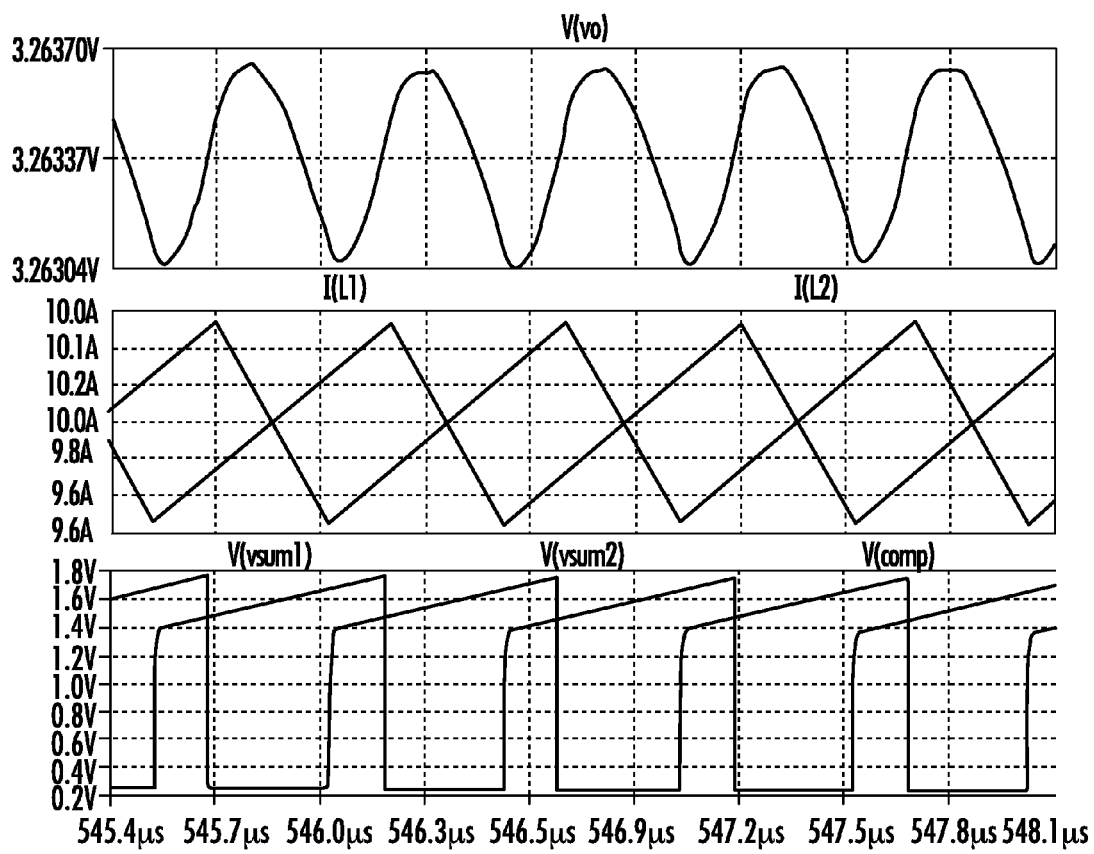
FIG. 12 illustrates the operation of a two phase non-inverting buck-boost converter running in a buck mode steady state.

Referring now to FIG. 12, there is illustrated a two phase non-inverting buck-boost converter running in the buck mode steady state where $V_{IN}$ is greater than $V_{OUT}$. These waveforms illustrate the buck-boost mode running in a buck mode where $V_{IN}$ is larger than $V_{OUT}$. The inductor current is interleaved to achieve current sharing and a small output ripple. The current in each phase is balanced.

Figure 13:
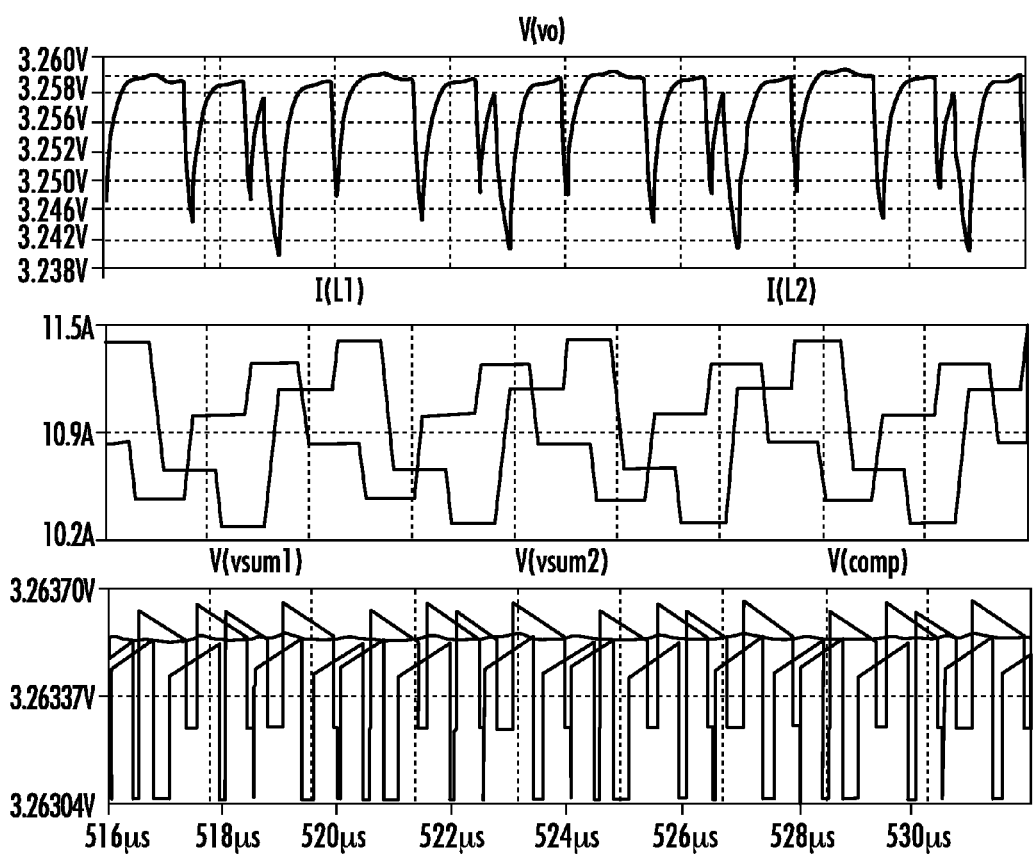
FIG. 13 illustrates a two phase non-inverting buck-boost converter running in a buck mode steady state.

Referring now to FIG. 13, there is illustrated a two phase non-inverting buck-boost converter in a buck mode of operation where $V_{IN}$ is closer than $V_{OUT}$. The inductor current is interleaved in a manner that is more complicated than pure buck and pure boost mode. In this operation region, the converter is working back and forth between a buck and boost mode in order to regulate the output voltage. In this manner, one phase can be running in buck mode while another phase is operated in boost mode. In this manner, the output ripple is reduced.

Figure 14:
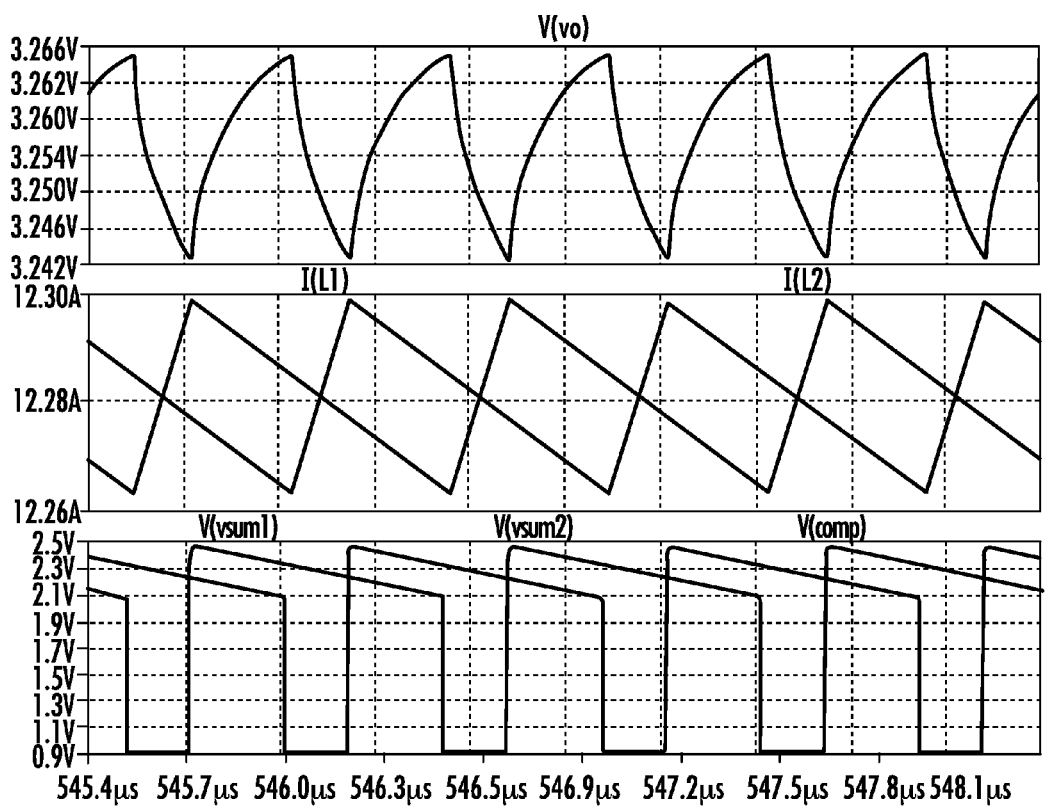
FIG. 14 illustrates a two phase non-inverting buck-boost converter running in a boost mode steady state.

Referring now to FIG. 14, there is illustrated a two phase non-inverting buck-boost converter running in buck mode wherein $V_{IN}$ is smaller than $V_{OUT}$. The inductor current is interleaved to achieve current sharing and a small output ripple. The current in each phase is balanced.

Thus, by placing multiple buck-boost power stages in parallel, more power is achieved. The design achieves current balancing without the addition of extra circuits needed to achieve the current balancing results. A smooth line transition between modes with small output ripple is also provided.

It will be appreciated by those skilled in the art having the benefit of this disclosure that this non-inverting buck boost voltage converter provides for improved operation when transitioning between buck and boost modes of operation. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A multi-phase non-inverting buck boost voltage converter, comprising:
- a plurality of buck boost converters, wherein each buck boost converter of the plurality of buck boost converters is associated with a separate phase of the multi-phase non-inverting buck boost voltage converter, for generating a regulated output voltage responsive to an input voltage;
- a plurality of current sensors, wherein each current sensor of the plurality of current sensors is coupled to an associated buck boost converter of the plurality of buck boost converters, for monitoring an input current to the associated buck boost converter and generating a current sense signal for the associated phase;
- a plurality of buck boost mode control circuits, wherein each buck boost mode control circuit of the plurality of buck boost mode control circuits is coupled to an associated buck boost converter, for controlling the associated buck boost converter utilizing peak current mode control in a buck mode of operation and valley current mode control in a boost mode of operation responsive to an error voltage and the current sense signal for the associated phase, wherein each buck boost mode control circuit of the plurality of buck boost mode control circuits includes circuitry for generating a buck control signal or a boost control signal responsive to a maximum duty cycle detection signal, the error voltage and the current sense signal, the maximum duty cycle detection signal being responsive to a maximum duty cycle condition in the buck mode of operation or the boost mode of operation, and wherein the plurality of buck boost mode control circuits provides current balancing between the phases; and
- a voltage error circuit coupled to the plurality of mode control circuits and the plurality of buck boost converters, for generating the error voltage responsive to the regulated output voltage.

2. The multi-phase non-inverting buck boost voltage converter of claim 1, wherein the voltage error circuit further includes an error amplifier for generating the error voltage responsive to the regulated output voltage and a reference voltage.

3. The multi-phase non-inverting buck boost voltage converter of claim 1, wherein each buck boost mode control circuit of the plurality of buck boost mode control circuits further comprises:
- PWM control logic for generating a buck PWM control signal and a boost PWM control signal responsive to the maximum duty cycle detection signal, the error voltage and the current sense signal;
- buck mode control and drive circuitry coupled to the PWM control logic, for generating a high side buck switching transistor control signal and a low side buck switching transistor control signal responsive to the buck PWM control signal and a mode signal;
- boost mode control and drive circuitry coupled to the PWM control logic, for generating a high side boost switching transistor control signal and a low side boost switching transistor control signal responsive to the boost PWM control signal and the mode signal; and
- mode control logic coupled to the buck mode control and drive circuitry and the boost mode control and drive circuitry, for generating the maximum duty cycle detection signal and the mode signal responsive to the buck PWM control signal and the boost PWM control signal.

4. The multi-phase non-inverting buck boost voltage converter of claim 3, further including current controlled compensation circuitry for generating a compensation voltage, wherein responsive to the mode signal in a first state, the compensation voltage is generated responsive to the monitored input current, a buck mode offset signal and a buck mode slope compensation signal, and responsive to the mode signal in a second state, the compensation voltage is generated responsive to the monitored input current, a boost mode offset signal and a boost mode slope compensation signal.

5. The multi-phase non-inverting buck boost voltage converter of claim 4, wherein the current controlled compensation circuitry further comprises:
- a first adder for adding the monitored input current, the buck mode offset signal and the buck mode slope compensation signal to generate a buck voltage compensation signal;
- a second adder for adding the monitored input current, the boost mode offset signal and the boost mode slope compensation signal to generate a boost voltage compensation signal; and
- a multiplexer for selecting the buck voltage compensation signal or the boost voltage compensation signal as the voltage compensation signal responsive to the mode signal.

6. The multi-phase non-inverting buck boost voltage converter of claim 3, wherein the mode control logic further comprises:
- maximum duty cycle detection circuitry for detecting a maximum duty cycle condition responsive to the buck PWM control signal and the boost PWM control signal and generating the maximum duty cycle detection signal; and
- mode selection circuitry for generating the mode signal indicating an operation in the boost mode or the buck mode responsive to the maximum duty cycle detection signal and a clock signal.

7. The multi-phase non-inverting buck boost voltage converter of claim 3, wherein the mode control logic further comprises:
- first control logic for setting a first value responsive to the buck PWM control signal or the boost PWM control signal reaching a maximum duty cycle value; and
- second control logic for outputting the first value as the mode signal responsive to a clock signal.

8. The multi-phase non-inverting buck boost voltage converter of claim 3, wherein each buck boost converter of the plurality of buck boost converters further includes:
- a high side buck switching transistor;
- a low side buck switching transistor;
- a high side boost switching transistor; and
- a low side boost switching transistor,
- wherein in the buck mode of operation, the high side boost switching transistor is turned on and the low side boost switching transistor is turned off responsive to the high side boost switching transistor control signal and the low side boost switching transistor control signal, and the high side buck switching transistor and the low side buck switching transistor are selectively switched responsive to the high side buck switching transistor control signal and the low side buck switching transistor control signal, and
- wherein in the boost mode of operation, the high side buck switching transistor is turned on and the low side buck switching transistor is turned off responsive to the high side buck switching transistor control signal and the low side buck switching transistor control signal, and the high side boost switching transistor and the low side boost switching transistor are selectively switched responsive to the high side boost switching transistor control signal and the low side boost switching transistor control signal.

9. The multi-phase non-inverting buck boost voltage converter of claim 4, wherein the PWM control logic further comprises:
   a PWM comparator for comparing the error voltage with the compensation voltage and generating a first PWM signal responsive thereto;
   PWM control logic for generating a second PWM signal and a third PWM signal responsive to the first PWM signal and the maximum duty cycle detection signal;
   a first latch for generating the buck PWM control signal responsive to the second PWM signal and a clock signal; and
   a second latch for generating the boost PWM control signal responsive to the third PWM signal and the clock signal.

10. The multi-phase non-inverting buck boost voltage converter of claim 1, wherein the error voltage provided to each buck boost mode control circuit of the plurality of buck boost mode control circuits provides the current balancing between the phases.

11. A method for controlling a multiphase, non-inverting buck boost voltage converter, comprising:
   generating a regulated output voltage responsive to an input voltage to a plurality of buck boost converters, wherein each buck boost converter of the plurality of buck boost converters is associated with a separate phase of the multiphase, non-inverting buck boost voltage converter;
   monitoring an input current to said each buck boost converter;
   generating a current sense signal for said each buck boost converter;
   controlling said each buck boost converter using a peak current mode control in a buck mode of operation and a valley current mode control in a boost mode of operation responsive to an error voltage and the current sense signal associated with the buck boost converter, wherein the controlling includes generating a buck control signal or a boost control signal responsive to a maximum duty cycle detection signal, the error voltage and the current sense signal, the maximum duty cycle detection signal being responsive to a maximum duty cycle condition in the buck mode of operation or the boost mode of operation; and
   balancing a plurality of phase currents between the plurality of buck boost converters responsive to at least the error voltage and the current sense signal for said each buck boost converter.

12. The method of claim 11, further including generating the error voltage responsive to the regulated output voltage and a reference voltage.

13. The method of claim 11, wherein the controlling further includes:
   generating a buck PWM control signal responsive to the maximum duty cycle detection signal, the error voltage and the compensation voltage; and
   generating a high side buck switching transistor control signal and a low side buck switching transistor control signal responsive to the buck PWM control signal and a mode signal.

14. The method of claim 11, wherein the controlling in a boost mode of operation further includes:
   generating a buck PWM control signal responsive to the maximum duty cycle detection signal, the error voltage and the compensation voltage;
   generating a boost PWM control signal responsive to the maximum duty cycle detection signal, the error voltage and the compensation voltage;
   generating a high side boost switching transistor control signal and a low side boost switching transistor control signal responsive to the boost PWM control signal and a mode signal; and
   generating the maximum duty cycle detection signal and the mode signal responsive to the buck PWM control signal and the boost PWM control signal.

15. The method of claim 14, further including generating the compensation voltage, wherein responsive to the mode signal in a first state, the compensation voltage comprises the monitored input current, a buck mode offset signal and a buck mode slope compensation signals, and responsive to the mode signal in a second state, the compensation voltage comprises the monitored input current, a boost mode offset signal and a boost mode slope compensation signal.

16. The method of claim 15, wherein the generating the compensation voltage further comprises:
   adding the monitored input current, the buck mode offset signal and the buck mode slope compensation signal to generate a buck voltage compensation signal;
   adding the monitored input current, the boost mode offset signal and the boost mode slope compensation signal to generate a boost voltage compensation signal; and
   selecting the buck voltage compensation signal or the boost voltage compensation signal as the voltage compensation signal responsive to the mode signal in the first state or the second state.

17. The method of claim 14, wherein the generating the maximum duty cycle detection signal and the mode signal further comprises:
   detecting the maximum duty cycle condition responsive to the buck PWM control signal and the boost PWM control signal;
   generating the maximum duty cycle detection signal responsive to the detected maximum duty cycle condition; and
   generating the mode signal indicating an operation in the boost mode or the buck mode responsive to the maximum duty cycle detection signal and a clock signal.

18. The method of claim 14, wherein the generating the buck PWM control signal and the boost PWM control signal further comprises:
   comparing the error voltage with the compensation voltage and generating a first PWM signal responsive thereto;
   generating a second PWM signal and a third PWM signal responsive to the first PWM signal and the maximum duty cycle detection signal;
   generating the buck PWM control signal responsive to the second PWM signal and a clock signal; and
   generating the boost PWM control signal responsive to the third PWM signal and the clock signal.

19. The method of claim 13, wherein the controlling further comprises:
   comparing the error voltage with the compensation voltage and generating a first PWM signal responsive thereto;
   generating a second PWM signal and a third PWM signal responsive to the first PWM signal and the maximum duty cycle detection signal;
   generating the buck PWM control signal responsive to the second PWM signal and a clock signal; and
   generating the boost PWM control signal responsive to the third PWM signal and the clock signal.

20. The method of claim 11, wherein the balancing further comprises comparing an error voltage associated with the phases of the multi-phase, non-inverting buck boost voltage converter with the current sense signal for said each buck boost converter.

21. A method for controlling a buck boost voltage converter, comprising:
monitoring an input current to a first buck boost converter of the buck boost voltage converter;
generating a first current sense signal responsive to the input current;
monitoring an output voltage of the buck boost voltage converter;
generating a compensation voltage signal responsive to the output voltage;
determining if a maximum duty cycle condition exists in a first mode of operation or a second mode of operation of the buck boost voltage converter;
generating a first control signal associated with the first mode of operation or the second mode of operation, if the maximum duty cycle condition exists in the first mode of operation or the second mode of operation;
generating a first plurality of drive signals responsive to the compensation voltage signal, the first current sense signal and the first control signal, if the maximum duty cycle condition exists;
generating the first plurality of drive signals responsive to the compensation voltage signal and the first current sense signal, if the maximum duty cycle condition does not exist;
generating the output voltage responsive to the first plurality of drive signals and the first current sense signal;
monitoring the input current to a second buck boost converter of the buck boost voltage converter;
generating a second current sense signal responsive to the input current;
determining if the maximum duty cycle condition exists in the first mode of operation or the second mode of operation of the buck boost voltage converter;
generating a second control signal associated with the first mode of operation or the second mode of operation, if the maximum duty cycle condition exists;
generating a second plurality of drive signals responsive to the compensation voltage signal, the second current sense signal and the second control signal, if the maximum duty cycle condition exists;
generating the second plurality of drive signals responsive to the compensation voltage signal and the second current sense signal, if the maximum duty cycle condition does not exist; and
generating the output voltage responsive to the second plurality of drive signals and the second current sense signal.

22. A method for operating a buck boost converter in a multi-phase, non-inverting buck boost voltage converter, comprising:
operating the buck boost converter in a first mode;
determining if a first maximum duty cycle condition is detected;
if the first maximum duty cycle condition is detected, operating the buck boost converter in a second mode;
determining if a second maximum duty cycle condition is detected; and
if the second maximum duty cycle condition is detected, operating the buck boost converter in the first mode.

23. The method of claim 22, wherein the first mode is a peak current control mode of operation, the second mode is a valley current control mode of operation, and the determining operation is performed by a mode control logic unit.

* * * * *